(12) United States Patent
Maeda et al.

(10) Patent No.: US 9,591,194 B2
(45) Date of Patent: Mar. 7, 2017

(54) ILLUMINATION DEVICE AND BIOMETRIC AUTHENTICATION APPARATUS

(71) Applicant: FUJITSU LIMITED, Kawasaki-shi, Kanagawa (JP)

(72) Inventors: Satoshi Maeda, Atsugi (JP); Soichi Hama, Atsugi (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/789,633

(22) Filed: Jul. 1, 2015

(65) Prior Publication Data
US 2016/0088203 A1    Mar. 24, 2016

(30) Foreign Application Priority Data

Sep. 24, 2014    (JP) .................................. 2014-194381

(51) Int. Cl.
*G06K 9/00*    (2006.01)
*H04N 5/225*    (2006.01)
(Continued)

(52) U.S. Cl.
CPC ......... *H04N 5/2256* (2013.01); *G02B 5/1842* (2013.01); *G06K 9/00013* (2013.01);
(Continued)

(58) Field of Classification Search
CPC ............. G02B 5/1842; G06K 9/00013; G06K 9/00892; G06K 9/2027; H04N 5/2256
(Continued)

(56) References Cited

U.S. PATENT DOCUMENTS 6,965,685 B1    11/2005 Smith
8,007,141 B2    8/2011 Matsubara et al.
(Continued)

FOREIGN PATENT DOCUMENTS

JP    2005-527874    9/2005
JP    2009-031903    2/2009
(Continued)

OTHER PUBLICATIONS

Coleman, Christopher et al., "Applications of diffractive optics with LED sources", Diffractive Optics and Micro-Optics, Jan. 1, 2000(Jan. 1, 2000), pp. 291-293, Jan. 1, 2000, XP055263643, Washington, D.C..
(Continued)

*Primary Examiner* — Manuchehr Rahmjoo
(74) *Attorney, Agent, or Firm* — Fujitsu Patent Center

(57) ABSTRACT

An illumination device includes M light sources provided on a surface of a substrate, a diffraction optical element configured to diffract light from the M light sources to irradiate N illuminating areas into which an illuminating region is segmented, and a control unit. The control unit turns on L=M/N light sources of each of first through Nth light source groups during first through Nth time intervals, respectively, and successively irradiates the light from the on L light sources of the first through Nth light source groups in time division onto first through N illuminating areas forming the illuminating region, where M and N are natural numbers greater than or equal to 2, and L is a natural number greater than or equal to 1.

15 Claims, 14 Drawing Sheets

(51) Int. Cl.
*H04N 5/232* (2006.01)
*G02B 5/18* (2006.01)
*G06K 9/20* (2006.01)

(52) U.S. Cl.
CPC ....... *G06K 9/00892* (2013.01); *G06K 9/2027* (2013.01); *H04N 5/23229* (2013.01)

(58) Field of Classification Search
USPC .......................................................... 382/115
See application file for complete search history.

(56) References Cited

U.S. PATENT DOCUMENTS

| | | | |
|---|---|---|---|
| 2004/0032585 A1* | 2/2004 | Johansen | G01J 3/18 |
| | | | 356/328 |
| 2009/0028396 A1 | 1/2009 | Kishima | |
| 2009/0134328 A1 | 5/2009 | Yamaguchi et al. | |
| 2009/0218527 A1 | 9/2009 | French et al. | |

FOREIGN PATENT DOCUMENTS

| | | |
|---|---|---|
| JP | 2013-130981 | 7/2013 |
| WO | 03-025836 | 3/2003 |

OTHER PUBLICATIONS

Extended European Search Report dated Apr. 21, 2016 for corresponding European Patent Application No. 15175425.6, 8 pages.

\* cited by examiner

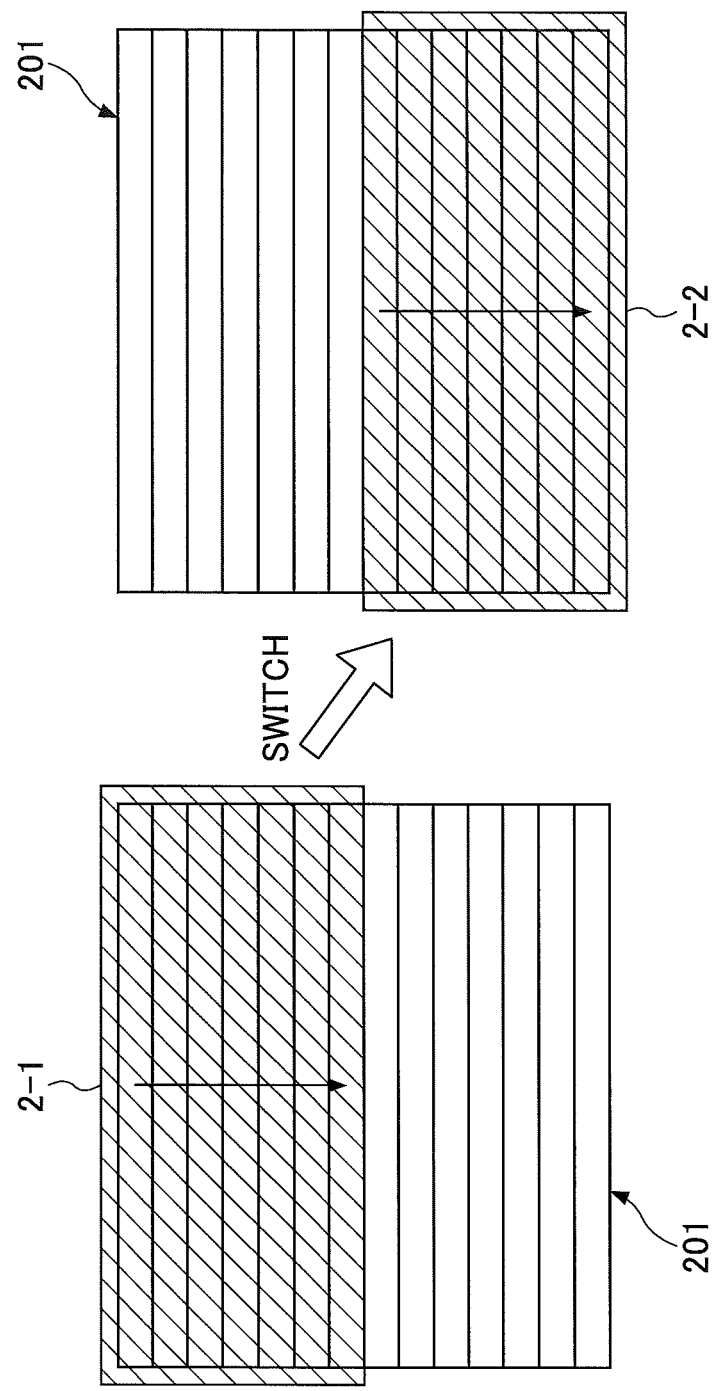

FIG.11A
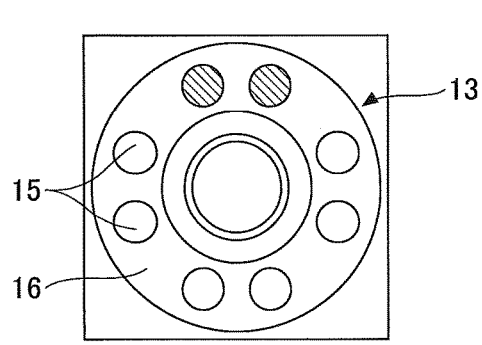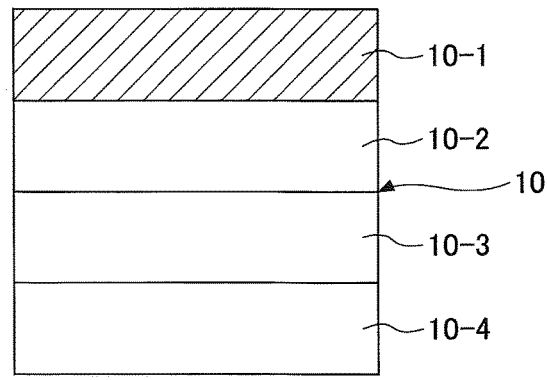
FIG.11B
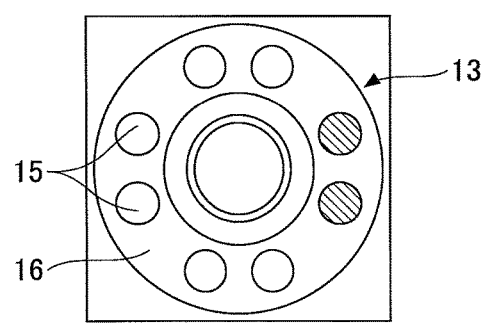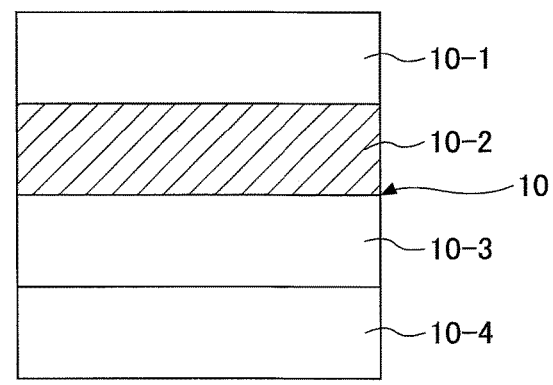

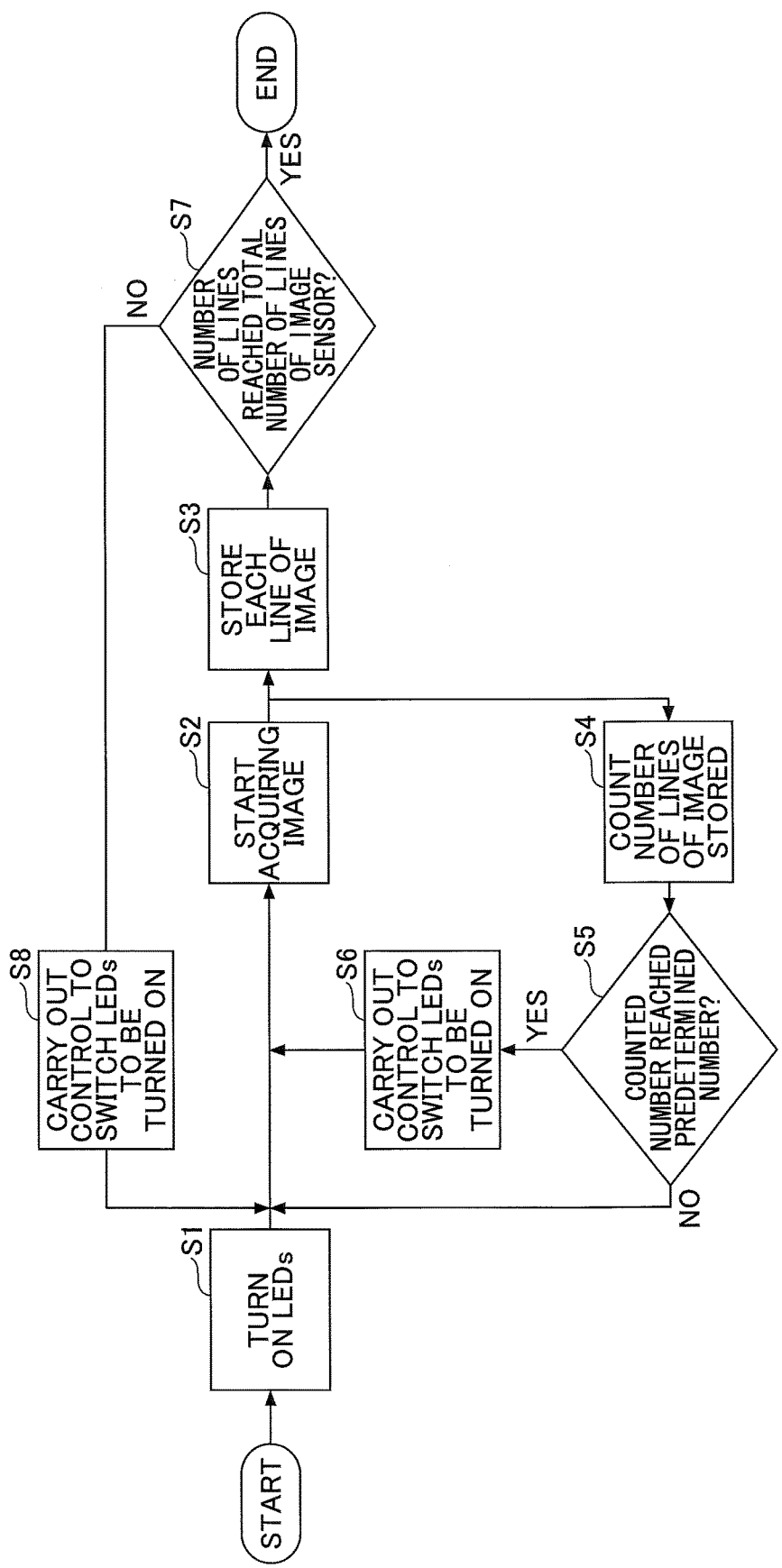

ILLUMINATION DEVICE AND BIOMETRIC AUTHENTICATION APPARATUS

CROSS-REFERENCE TO RELATED APPLICATIONS

This application is based upon and claims the benefit of priority of the prior Japanese Patent Application No. 2014-194381 filed on Sep. 24, 2014, the entire contents of which are incorporated herein by reference.

FIELD

The embodiments discussed herein are related to an illumination device and a biometric authentication apparatus.

BACKGROUND

Recently, biometric authentication techniques have been developed to make contactless (or non-contact) authentication of a system user, based on an biometric image representing biometric information such as a vein pattern of a hand or finger, a fingerprint, a palmprint, or the like. A biometric authentication apparatus utilizing the biometric authentication technique collates an input biometric image representing the user's biometric information with registered biometric information representing a biometric image of a registered user registered in advance. In a case in which the input biometric information and the registered biometric information match as a result of the collating process, the biometric authentication apparatus authenticates the user as a legitimate user (that is, the registered user) who is authorized to use the system, and permits the authenticated user to use the system. For example, the biometric authentication apparatus may be built into the system, or may be externally connected to the system.

The biometric authentication apparatus is being utilized in various fields, such as log-on management to a personal computer, identity verification in an ATM (Automated Teller Machine) of a bank, access management to an office, or the like, for example. In addition, there are demands to reduce the size of the biometric authentication apparatus in order to expand the range in which the biometric authentication apparatus may be applied.

In order for the biometric authentication apparatus to authenticate the user with a high accuracy, it is desirable that a feature configuration of the biometric information clearly appears on the biometric image. For this reason, a sensor used in the biometric authentication apparatus to generate the biometric image may be provided with an illuminating optical system that irradiates illumination light on a capturing target such as the user's hand, in addition to an imaging optical system that captures the biometric information of the capturing target such as the user's hand using an imaging lens and an imaging device such as a CCD (Charged Coupled Device).

For example, Japanese Laid-Open Patent Publications No. 2009-031903 and No. 2013-130981 and Japanese National Publication of International Patent Application No. 2005-527874 propose a biometric authentication technique using the illuminating optical system and the imaging optical system. On the other hand, in order to expand the range in which the biometric authentication apparatus may be applied, it is desirable to reduce power consumption of the biometric authentication apparatus by considering a case in which the biometric authentication apparatus is driven by a battery, for example, in addition to satisfying the demands to reduce the size of the authentication apparatus.

For example, Japanese Laid-Open Patent Publication No. 2009-031903 proposes a thin type biometric authentication apparatus that acquires the biometric information, using an optical system integrally having the imaging optical system and the illuminating optical system that has a size approximately equal to or greater than the capturing target such as the finger to be authenticated. According to this proposed biometric authentication apparatus, the power consumption may be reduced because an illuminating range is controlled according to a capturing range of the biometric image. However, in a case in which the capturing target is a biometric part, such as the palm, that is large compared to the finger, for example, the illuminating optical system becomes large and it is difficult to reduce the size of the illuminating optical system.

On the other hand, Japanese Laid-Open Patent Publication No. 2013-130981 proposes a biometric authentication apparatus configured to sandwich the biometric part between the imaging optical system and the illuminating optical system that has the size approximately equal to or greater than the capturing target such as the finger to be authenticated. According to this proposed biometric authentication part, the power consumption may be reduced because the illuminating range is controlled according to the capturing range of the biometric image. However, in the case in which the capturing target is the biometric part, such as the palm, that is large compared to the finger, for example, the illuminating optical system becomes large and it is difficult to reduce the size of the illuminating optical system, as in the case of the biometric authentication apparatus proposed in Japanese Laid-Open Patent Publication No. 2009-031903.

In the conventional biometric authentication apparatuses provided with the illumination device, including the proposed biometric authentication apparatuses described above and biometric sensors, the illumination device and the biometric authentication apparatus become large and it is difficult to reduce the size of the illumination device and the biometric authentication apparatus in the case in which the biometric part that is the capturing target is large compared to the illuminating optical system of the illumination device.

SUMMARY

Accordingly, it is an object in one aspect of the embodiments to provide an illumination device and a biometric authentication apparatus which can reduce power consumption even in a case in which an illuminating region of a capturing target is large compared to the illumination device.

According to one aspect of the embodiments, an illumination device includes M light sources provided on a surface of a substrate; a diffraction optical element configured to diffract light from the M light sources to irradiate N illuminating areas into which an illuminating region is segmented; and a control unit configured to turn on L=M/N light sources of each of first through Nth light source groups during first through Nth time intervals, respectively, and successively irradiate the light from the on L light sources of the first through Nth light source groups in time division onto first through N illuminating areas forming the illuminating region, where M and N are natural numbers greater than or equal to 2, and L is a natural number greater than or equal to 1.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram for explaining an example of a switching of illuminating areas in a first embodiment;

FIG. 11A is a diagram for explaining an other example of the switching of the illuminating areas;

FIG. 11B is a diagram for explaining the other example of the switching of the illuminating areas;

FIG. 12 is a flow chart for explaining an example of an illuminating area switching process;

DESCRIPTION OF EMBODIMENTS

Preferred embodiments of the present invention will be described with reference to the accompanying drawings.

A description will now be given of the illumination device and the biometric authentication apparatus in each embodiment according to the present invention.

In one embodiment, a plurality of illuminating areas forming an illuminating region are allocated to a plurality of light sources, and each of the plurality of light sources is controlled to turn on or off at a timing such that the illuminating area allocated thereto becomes an exposing target of an image sensor.

Figure 1A:
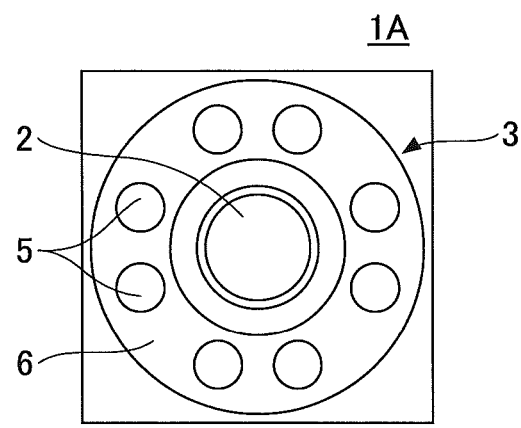
FIG. 1A is a plan view illustrating a first example of a sensor for a biometric authentication apparatus.
Figure 1B:
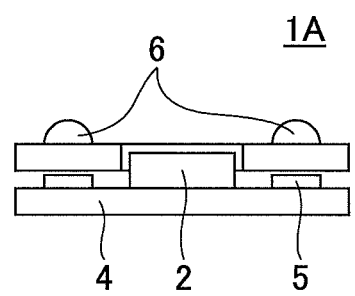
FIG. 1B is a side view schematically illustrating the first example of the sensor for the biometric authentication apparatus.
Figure 1C:
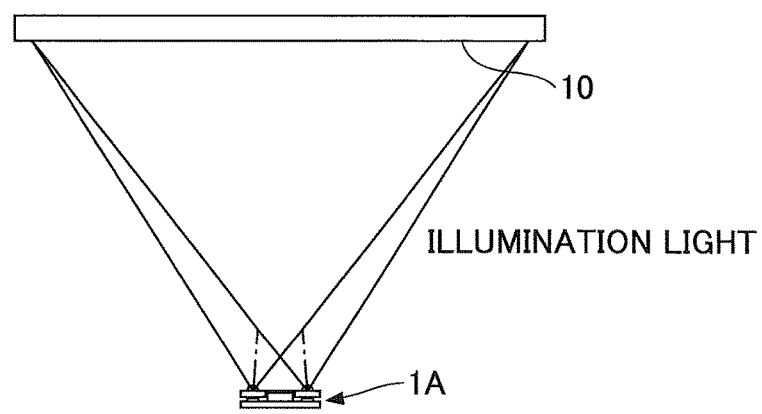
FIG. 1C is a diagram schematically illustrating illumination light in the first example of the sensor for the biometric authentication apparatus.

FIGS. 1A through 1C are diagrams for explaining a first example of a sensor for a biometric authentication apparatus. FIG. 1A is a plan view (or top view) illustrating the first example of the sensor for the biometric authentication apparatus, FIG. 1B is a side view schematically illustrating the first example of the sensor for the biometric authentication apparatus, and FIG. 1C is a diagram schematically illustrating illumination light in the first example of the sensor for the biometric authentication apparatus. A sensor 1A for the biometric authentication apparatus includes an imaging optical system 2, such as a camera, and an illuminating optical system 3. The illuminating optical system 3 includes a plurality of LEDs (Light Emitting Diodes) 5 (8 LEDs in this example) provided on a substrate 4, and a lens array 6. The LEDs 5 are examples of light sources. In this example, the LEDs 5 are arranged in a ring shape on an outer side of the imaging optical system 2, and the lens array 6 is provided in a ring shape so as to oppose the LEDs 5, as illustrated in FIG. 1A. As illustrated in FIG. 1C, illumination light from each of the LEDs 5 is spread by the lens array 6 and irradiated in an overlapping manner on an illuminating region 10 of a biometric part to be authenticated.

Figure 2A:
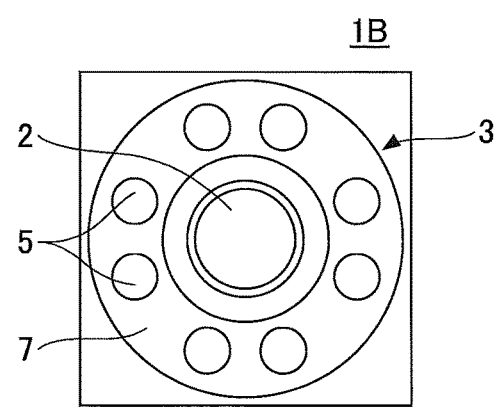
FIG. 2A is a plan view illustrating a second example of the sensor for the biometric authentication apparatus.
Figure 2B:
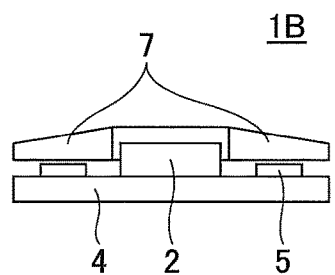
FIG. 2B is a side view schematically illustrating the second example of the sensor for the biometric authentication apparatus.
Figure 2C:
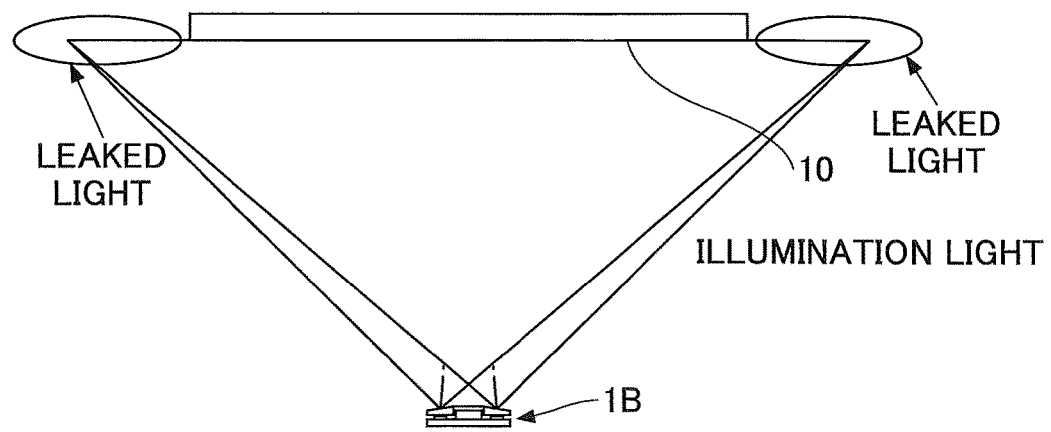
FIG. 2C is a diagram schematically illustrating the illumination light in the second example of the sensor for the biometric authentication apparatus.

FIGS. 2A through 2C are diagrams for explaining a second example of the sensor for the biometric authentication apparatus. FIG. 2A is a plan view (or top view) illustrating the second example of the sensor for the biometric authentication apparatus, FIG. 2B is a side view schematically illustrating the second example of the sensor for the biometric authentication apparatus, and FIG. 2C is a diagram schematically illustrating the illumination light in the second example of the sensor for the biometric authentication apparatus. In FIGS. 2A through 2C, those parts that are the same as those corresponding parts in FIGS. 1A through 1C are designated by the same reference numerals, and a description thereof will be omitted. In a sensor 1B for the biometric authentication apparatus illustrated in FIGS. 2A and 2B, a diffusion light guide plate 7 is provided in a ring shape so as to oppose the LEDs 5, in place of the lens array 6 illustrated in FIGS. 1A and 1B. As illustrated in FIG. 2C, illumination light from each of the LEDs 5 is diffused by the diffusion light guide plate 7 and irradiated in an overlapping manner on the illuminating region 10 of the biometric part to be authenticated. An intensity of the illumination light is approximately uniform regardless of the position on the illumination region 10, when compared to the case illustrated in FIG. 1C. However, the diffused illumination light is irradiated in a region wider than the illuminating region 10, and leaked light is wasted on an outer side of the illuminating region 10 as indicated by regions surrounded by oval marks in FIG. 2C.

In the first and second examples of the sensor for the biometric authentication apparatus, even in a case in which the area of the biometric part (for example, palm) to be authenticated, in the plan view of the illuminating region 10, is greater than the area of the illuminating optical system 3 in the plan view illustrated in FIG. 1A or FIG. 2A, the size of the illumination device can be reduced by using a projection type illuminating optical system for the illuminating optical system 3. By overlapping the illumination light from the plurality of LEDs 5, uniform and bright illumination light can be irradiated on the illuminating region 10. However, because the plurality of LEDs 5 are simultaneously driven to overlap the illumination light therefrom, a larger number LEDs 5 are required, and the power consumption increases.

In addition, in the case of the illumination light irradiated on the illuminating region 10 via the lens array 6 or the diffusing light guide plate 7, it is difficult to control a range or shape of an irradiation pattern of the illumination light. Even if the technique proposed in Japanese Laid-Open Patent Publication No. 2009-031903 or No. 2013-130981 described above to turn on and off the LEDs for illumination were applied to the first or second example of the sensor for the biometric authentication apparatus, this would only change the brightness of the overlapping illumination light in the illuminating region 10. In a case in which the area of the illuminating region 10 of the biometric part to be authenticated is greater than the illuminating optical system 3 in the plan view, it would be difficult to simultaneously reduce the size and the power consumption of the illumination device.

Figure 3:
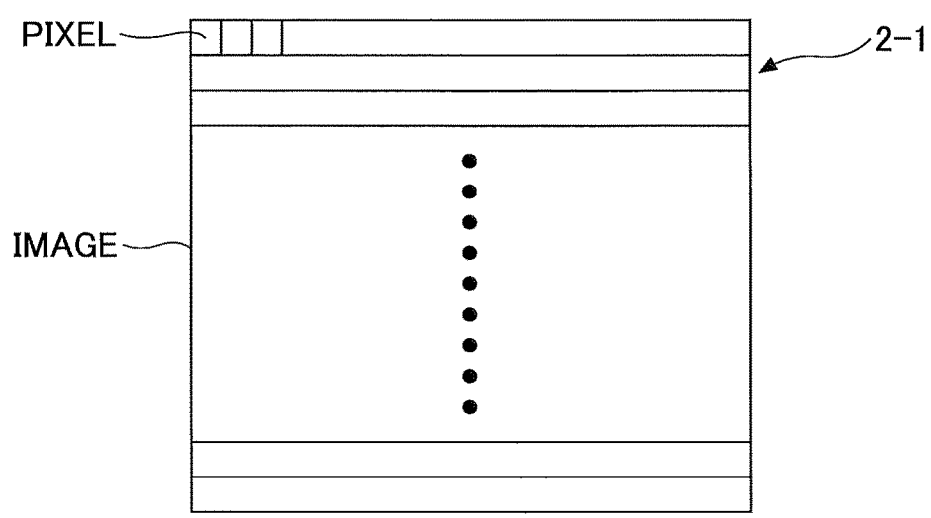
FIG. 3 is a diagram for explaining an example of a rolling shutter type image sensor.

FIG. 3 is a diagram for explaining an example of a rolling shutter type image sensor. FIG. 3 schematically illustrates acquisition and transfer of image data of a rolling shutter type image sensor 201 that is used for the imaging optical system 2 of the first or second example of the sensor for the biometric authentication apparatus, and each line (or row) of the image is formed by a plurality of pixels that are illustrated by squares for the sake of convenience. The image sensor 201 has a known configuration for successively executing a process in which each line of the image data is acquired (that is, by camera exposure) and transferred to a buffer, in a case in which a storage capacity of the buffer that stores the image data is relatively small to minimize cost, or the like. For this reason, the illumination light is constantly irradiated even on parts of the illuminating region 10 that correspond to the lines of the image data not being acquired by the image sensor 201, and power is consumed and wasted to generate the illumination light for irradiating the parts of the illuminating region 10 that correspond to the lines of the image data not being acquired by the image sensor 201. Hence, it is difficult to simultaneously reduce the size and the power consumption of the illumination device. On the other hand, in a case in which a global shutter type image sensor that simultaneously acquires the image data of all of the lines (that is, by the camera exposure) and transfers the acquired image data to the buffer is used for the imaging optical system 2, the illumination light is constantly irradiated on all parts of the illuminating region 10, and thus, the power consumption is substantially the same as the case in which the rolling shutter type image sensor 201 is used for the imaging optical system 2.

FIG. 4 is a diagram for explaining an example of a switching of illuminating areas in a first embodiment. The illuminating region 10 of the biometric part (for example, palm) to be authenticated is segmented into a plurality of illuminating areas, and the illuminating area that is illuminated by the illumination light from the light source is successively switched. FIG. 4 illustrates a case in which a region of the rolling shutter type image sensor 201 is segmented into 2 exposure areas 2-1 and 2-2 corresponding to 2 illuminating areas into which the illuminating region 10 is equally segmented, and a first time interval and a second time interval are alternately repeated. In the first time interval, the first exposure area 2-1 is exposed when the illumination light from one of more first light sources is irradiated on the first illuminating area. In the second time interval, the second exposure area 2-2 is exposed when the illumination light from a second light source different from the one or more second light sources is irradiated on the second illuminating area. During the first time interval in this example, each line of the image data is acquired (that is, by the camera exposure) within the first exposure area 2-1 indicated by hatchings in a left part of FIG. 4, in an order indicated by an arrow, for example, and transferred to the buffer. During the second time interval in this example, each line of the image data is acquired (that is, by the camera exposure) within the second exposure area 2-2 indicated by hatchings in a right part of FIG. 4, in an order indicated by an arrow, for example, and transferred to the buffer. The irradiation of the illumination light onto the first illuminating area during the first time interval by the illumination device, and the acquisition of each line of the image data within the first exposure area 2-1 and transfer of each acquired line of the image data to the buffer, are synchronized. Similarly, the irradiation of the illumination light onto the second illuminating area during the second time interval by the illumination device, and the acquisition of each line of the image data within the second exposure area 2-2 and transfer of each acquired line of the image data to the buffer, are synchronized. By irradiating the illumination light from the illumination device to the first and second illuminating areas of the illuminating region 10 in time division, it is possible to reduce the number of light sources that are simultaneously driven and thus reduce the power consumption, compared to the case in which the illumination light irradiates the entire illuminating region 10 at one time.

In the example illustrated in FIG. 4, the illuminating region 10 is segmented into two illuminating areas. However, the number of illuminating areas into which the illuminating region 10 is segmented is not limited to two, and may be any plural number, and thus, the number of exposure areas corresponding to the illuminating areas may be may be any plural number. In addition, One exposure area corresponding to one illuminating area may have an area of any size, as long as this area corresponds to one line of the image sensor 201 or greater. Because the illuminating region 10 is segmented into the plurality of illuminating areas and the exposure area of the image sensor 201 is segmented into a corresponding number of exposure areas, one exposure area corresponding to one illuminating area preferably has an area of one line of the image sensor 201 or greater, and less than or equal to one-half (½) a total exposure area of the image sensor 201.

Figure 5A:
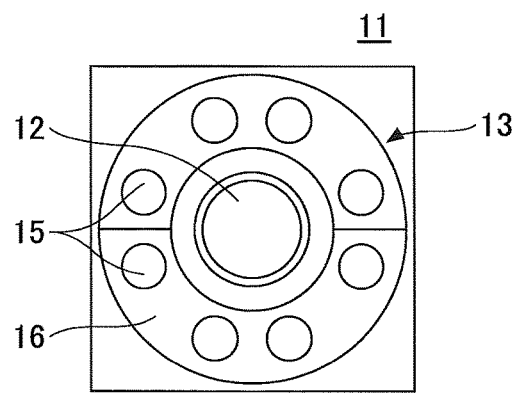
FIG. 5A a is plan view illustrating an example of a sensor for a biometric authentication apparatus in the first embodiment.
Figure 5B:
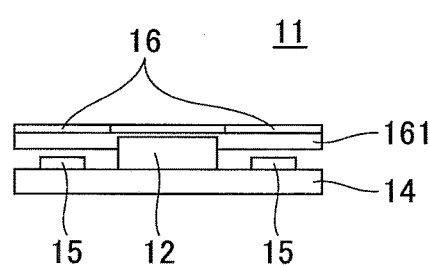
FIG. 5B is a side view schematically illustrating the example of the sensor for the biometric authentication apparatus in the first embodiment.
Figure 5C:
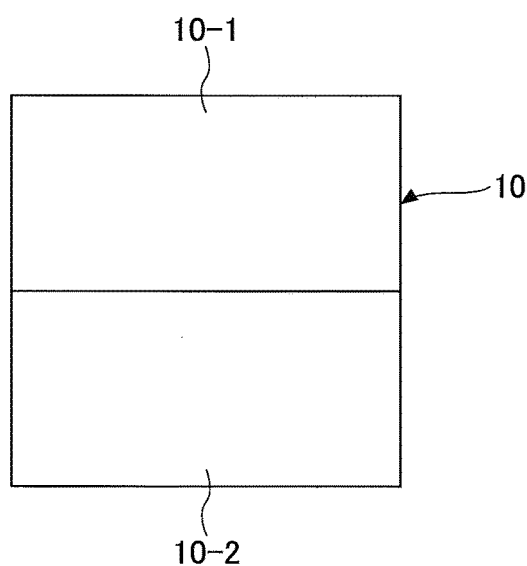
FIG. 5C is a diagram schematically illustrating illumination light in the example of the sensor for the biometric authentication apparatus in the first embodiment.

FIGS. 5A through 5C are diagrams for explaining an example of the sensor for a biometric authentication apparatus in a first embodiment. FIG. 5A a is plan view illustrating the example of the sensor for the biometric authentication apparatus in the first embodiment, FIG. 5B is a side view schematically illustrating the example of the sensor for the biometric authentication apparatus in the first embodiment, and FIG. 5C is a diagram schematically illustrating illumination light in the example of the sensor for the biometric authentication apparatus in the first embodiment.

A sensor 11 for the biometric authentication apparatus illustrated in FIGS. 5A and 5B includes the imaging optical system 12, such as the camera, and the illuminating optical system 13. The illuminating optical system 13 includes a plurality of LEDs 15 (8 in this example) provided on a substrate 14, and a diffraction optical element 16. In this example, the LEDs 15, which are examples of the light sources, are arranged in a ring shape on an outer side of the imaging optical system 12. The diffraction optical element 16 is provided in a ring shape on a light emitting surface side of the LEDs 15, so as to oppose the LEDs 15. In addition, because the sensor 11 for the biometric authentication apparatus is applied to a palm vein authentication in this example, the LEDs 15 emit light in a wavelength band of a single color, and captures a vein pattern using near-infrared rays having a high transmittance with respect to the biometric part. However, the wavelength or properties of the light emitted from the light source may be appropriately selected according to the usage of the illumination device.

As illustrated in FIG. 5B, the diffraction optical element 16 is formed on a substrate 161 made of glass or plastic, for example. In a case in which the substrate 161 is formed by a glass substrate, the diffraction optical element 16 may be formed using a method that treats the glass directly by an etching or the like, a method of transferring and patterning a photopolymer ultraviolet curing resin, or the like. On the other hand, in a case in which the substrate 161 is formed by a plastic substrate, the diffraction optical element 16 may be formed using a method that treats the plastic directly at the same time as when molding by an injection molding or a hot embossing, a method of transferring and patterning a photopolymer ultraviolet curing resin, or the like. Furthermore, in a case in which the substrate 161 is formed by a thin film, the diffraction optical element 16 may be formed using a method that treats the thin film directly at the same time as when molding by a hot embossing, a method of transferring and patterning a photopolymer ultraviolet curing resin, or the like. In this case, the film-shaped diffraction optical element 16 may be adhered onto a glass or plastic substrate.

In this example, the diffraction optical element 16 is formed on a light existing surface of the substrate 161 from which the light from the LEDs 15 is emitted, on an opposite side (upper side in FIG. 5B) from a light incident surface of the substrate 161 to which the light from the LEDs 15 becomes incident. However, the diffraction optical element 16 may be formed on the light incident surface of the substrate 161. The diffraction optical element 16 may be designed by taking into consideration effects of an index of refraction determined by the material and thickness of the substrate 161. A gap between the light emitting surface of the LEDs 15 and the light incident surface of the diffraction optical element 16 (that is, the light incident surface of the substrate 161) is preferably greater than zero (0), but may be zero (0).

In FIG. 5A, amongst the 8 LEDs 15, the illumination light from the 4 LEDs 15 in an upper half, for example, irradiates via the diffraction optical element 16 only a first illuminating area 10-1 in an upper half of the illuminating region 10 illustrated in FIG. 5C. On the other hand, amongst the 8 LEDs 15, the illumination light from the 4 LEDs 15 in a lower half, for example, irradiates via the diffraction optical element 16 only a second illuminating area 10-2 in a lower half of the illuminating region 10 illustrated in FIG. 5C. By turning on only the 4 upper half LEDs 15 during the first time interval, the illumination light irradiates only the first illuminating area 10-1. In addition, by turning on only the 4 lower half LEDs 15 during the second time interval following the first time interval, the illumination light irradiates only the second illuminating area 10-2. Accordingly, by alternately turning on the 4 upper half LEDs 15 and the 4 lower half LEDs 15, the illumination light can irradiate the first and second illuminating areas 10-1 and 10-2 of the illuminating region 10 in time division. In this example, compared to a case in which all the 8 LEDs 15 are turned on to irradiate the entire illuminating region 10 by the illumination light, the number of LEDs 15 that are driven simultaneously can be reduced to one-half, and the power consumption can be reduced by a corresponding amount.

In addition, in this example, pattern shapes of the first and second illuminating areas 10-1 and 10-2 respectively are rectangular, and the square illuminating region 10 is formed by combining the first and second illuminating areas 10-1 and 10-2, as illustrated in FIG. 5C. However, the pattern shape of each illuminating area may be determined according to each exposure area of the image sensor 201 that captures the image. For example, in a case in which the biometric part that is the capturing target has a rectangular shape, such as a finger, the pattern shape of each illuminating area may be square, and a rectangular illuminating region 10 may be formed by combing 2 square illuminating areas. By appropriately designing the diffraction optical element 16, it is possible to form pattern shapes of various illuminating areas to suit the capturing target.

Figure 6A:
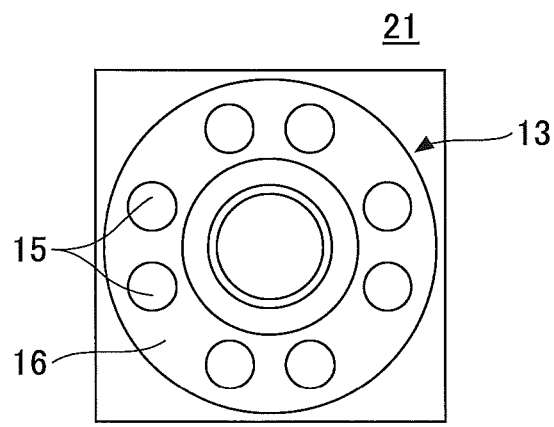
FIG. 6A is a plan view illustrating an example of the illumination device in a second embodiment.
Figure 6B:
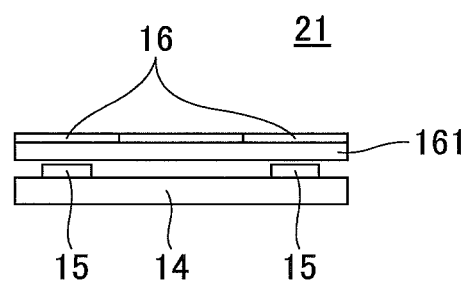
FIG. 6B is a side view schematically illustrating the example of the illumination device in the second embodiment.

FIGS. 6A and 6B are diagrams for explaining an example of the illumination device in a second embodiment. FIG. 6A is a plan view illustrating the example of the illumination device in the second embodiment, and FIG. 6B is a side view schematically illustrating the example of the illumination device in the second embodiment. In FIGS. 6A and 6B, those parts that are the same as those corresponding parts in FIGS. 5A and 5B are designated by the same reference numerals, and a description thereof will be omitted.

A illumination device 21 illustrated in FIGS. 6A and 6B includes a plurality of LEDs 15 (8 in this example) provided on the substrate 14, and the diffraction optical element 16.

Figure 7A:
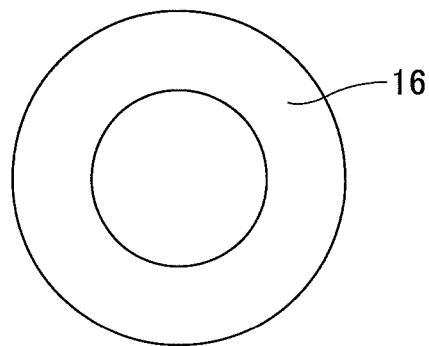
FIG. 7A is a plan view illustrating an example of an arrangement of a diffraction optical element.
Figure 7B:
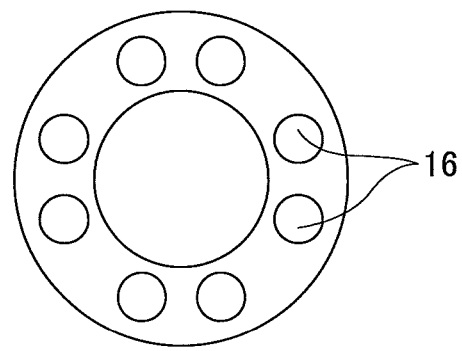
FIG. 7B is a plan view illustrating an other example of the arrangement of the diffraction optical element.

FIGS. 7A and 7B are plan views illustrating examples of an arrangement of the diffraction optical element. The diffraction optical element 16 may be formed generally with respect to the entire surface of the substrate 161 as illustrated in FIG. 7A, or may be formed only at parts of the substrate 161 irradiated with the light from the LEDs 15 as illustrated in FIG. 7B.

In each of the embodiments described above, the LEDs 15 and the diffraction optical element 16 are arranged in the ring shape. However, the LEDs 15 and the diffraction optical element 16 may be arranged in a lattice shape, for example. The arrangement of the LEDs 15 and the diffraction optical element 16 may be appropriately modified according to the size, shape, or the like of the illumination device 21. Moreover, even in the case in which the diffraction optical element 16 is formed only at the parts of the substrate 161 irradiated with the light from the LEDs 15 as illustrated in FIG. 7B, the diffraction optical element 16 may be arranged to suit the arrangement of the LEDs 15.

Figure 8:
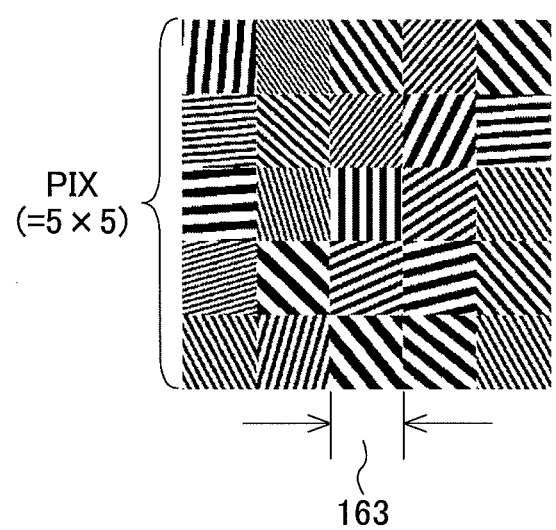
FIG. 8 is a plan view illustrating an example of diffraction gratings of the diffraction optical element.

FIG. 8 is a plan view illustrating an example of diffraction gratings of the diffraction optical element. In this example, the diffraction optical element 16 includes a plurality of diffraction gratings (hereinafter also referred to as "cells") 163 arranged two-dimensionally in a matrix arrangement. In this example, the diffraction optical element 16 includes an assembly of 25 cells 163. The number of cells 163 that are arranged two-dimensionally in the diffraction optical element 16 may be set according to the area of the illuminating region 10. A pitch (or lattice pitch) and a rotating direction (or rotating angle) of the cells 163 may be designed so that the illumination light from the 4 upper half LEDs 15 illustrated in FIG. 6A irradiates the first illuminating area 10-1 of FIG. 5C, and the illumination light from the 4 lower half LEDs 15 illustrated in FIG. 6A irradiates the second illuminating area 10-2 of FIG. 5C. The cell 163 is not limited to a rectangular shape, and the two-dimensional arrangement of the cells 163 is not limited to the matrix arrangement. The number of cells 163 is not limited to a certain number. In the following description, the number of cells 163 along one side of the diffraction optical element 16 may also be referred to as "a pixel number PIX".

Figure 9A:
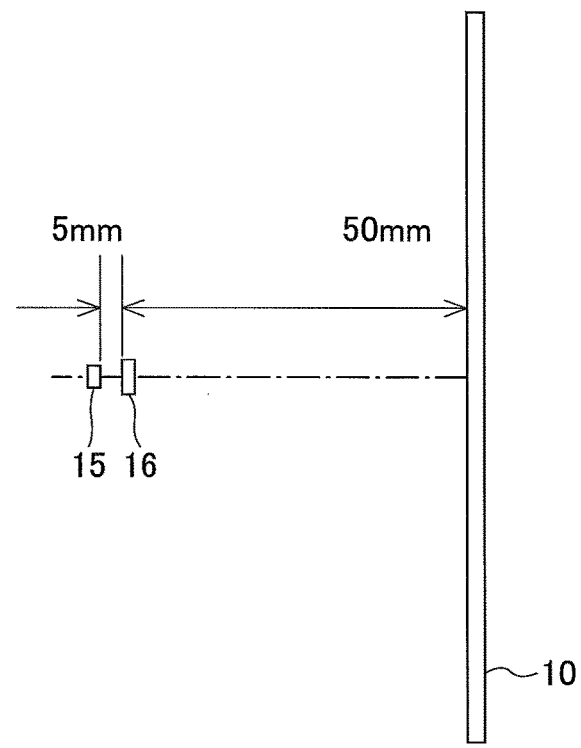
FIG. 9A is a diagram for explaining an example of a configuration of the diffraction optical element.
Figure 9B:
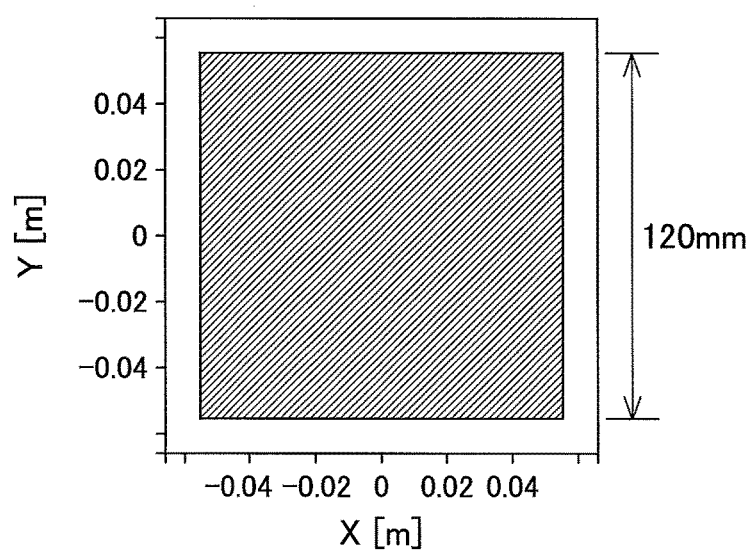
FIG. 9B is a diagram schematically illustrating an example of evaluation results of the diffraction optical element.

FIG. 9A is a diagram for explaining an example of a configuration of the diffraction optical element, and FIG. 9B is a diagram schematically illustrating an example of evaluation results of the diffraction optical element. FIG. 9A illustrates a positional relationship of the LED 15, the diffraction optical element 16, and the illuminating region 10. FIG. 9B illustrates a measured result of the illuminating region 10. In this example, the illuminating region 10 has a rectangular shape with a size of 110 mm×110 mm. The light emitting surface of the LED 15 has a rectangular shape with a size of 3 mm×3 mm, and has a light emission wavelength of 545 nm. A gap between the LED 15 and the diffraction optical element 16 is 5 mm. The substrate 161 of the diffraction optical element 16 is made of synthetic quartz, and has a thickness of 2 mm. A gap between the diffraction optical element 16 and the illuminating region 10 is 50 mm. In a case in which the diffraction optical element 16 has a rectangular shape with a size of 5 mm×5 mm, the pixel number PIX of the diffraction optical element 16 is 250, and the cell 163 has a rectangular shape with a size of 0.02 mm×0.02 mm, the light intensity distribution is uniform in the illuminating region 10 that is larger than an area of the illumination device 21 in the plan view and is formed by combining the first and second illuminating areas 10-1 and 10-2 that are irradiated by the illumination light in time division, as indicated by hatchings in FIG. 9B. The area of the illumination device 21 in the plan view refers to the area occupied by the illumination device 21 on a plane parallel to the surface of the substrate 14 or the substrate 161. In FIG. 9B, Y [m] corresponds to the position along an up-and-down direction in FIG. 9A, for example, and X [m] corresponds to the position along a direction perpendicular to the paper (or drawing surface) in FIG. 9A, for example. A light emission center wavelength of the LED 15 may be a near-infrared wavelength that is generally used by the biometric authentication apparatus or the sensor for the biometric authentication apparatus. Further, the cells 163 and the pixel number PIX of the diffraction optical element 16 for obtaining each of the first and second illuminating areas 10-1 and 10-2 of the required illuminating region 10 may be designed based on the light emission center wavelength. The cells 163 and the pixel number PIX of the diffraction optical element 16 for obtaining each of the first and second illuminating areas 10-1 and 10-2 of the required illuminating region 10 may be designed based on conditions for forming the entire optical system including the imaging optical system 12 and the illuminating optical system 13. By appropriately designing the pitch and the rotating direction of each of the cells 163, the light intensity distribution can be controlled to become uniform in the illuminating region 10 that is formed by combining the first and second illuminating areas 10-1 and 10-2 that are irradiated by the illumination light in time division.

In FIG. 5C, the light intensities in the first and second illuminating areas 10-1 and 10-2 may be the same. Alternatively, a gradation may be provided in the light intensities at a boundary part between the mutually adjacent first and second illuminating areas 10-1 and 10-2, and the first and second illuminating areas 10-1 and 10-2 may overlap at the boundary part.

In the latter case, the pitch and the rotating direction of each of the cells 163 may be appropriately designed so that the light intensity in the first illuminating area 10-1 gradually decreases towards the boundary part, the light intensity in the second illuminating area 10-2 gradually decreases towards the boundary part, and the two mutually adjacent first and second illuminating areas 10-1 and 10-2 overlap at the boundary part such that a total light intensity at the boundary part may be regarded as being equal to the light intensity at parts of the first and second illuminating areas 10-1 and 10-2 other than the boundary part. In this case, a switching speed at which the first and second illuminating areas 10-1 and 10-2 is switched may be appropriately set, so that the total light intensity at the boundary part of the first and second illuminating areas 10-1 and 10-2 may be regarded as being equal to the light intensity at parts of the first and second illuminating areas 10-1 and 10-2 other than the boundary part. In addition, in this case, an overlapping part of two exposure areas of the image sensor 201, corresponding to the overlapping part of the two mutually adjacent illuminating areas, may amount to an area of one line of the image sensor 201 or greater. By providing the overlapping part described above, it is possible to positively prevent a region in which no illumination light is irradiated, or a region in which the light intensity is lower than that at other part, from being generated at the boundary part of the first and second illuminating areas 10-1 and 10-2 due to manufacturing inconsistencies or the like of the diffraction optical element 16.

Next, a description will be given of an example of the switching of the illuminating areas in each of the embodiments described above.

Figure 10A:
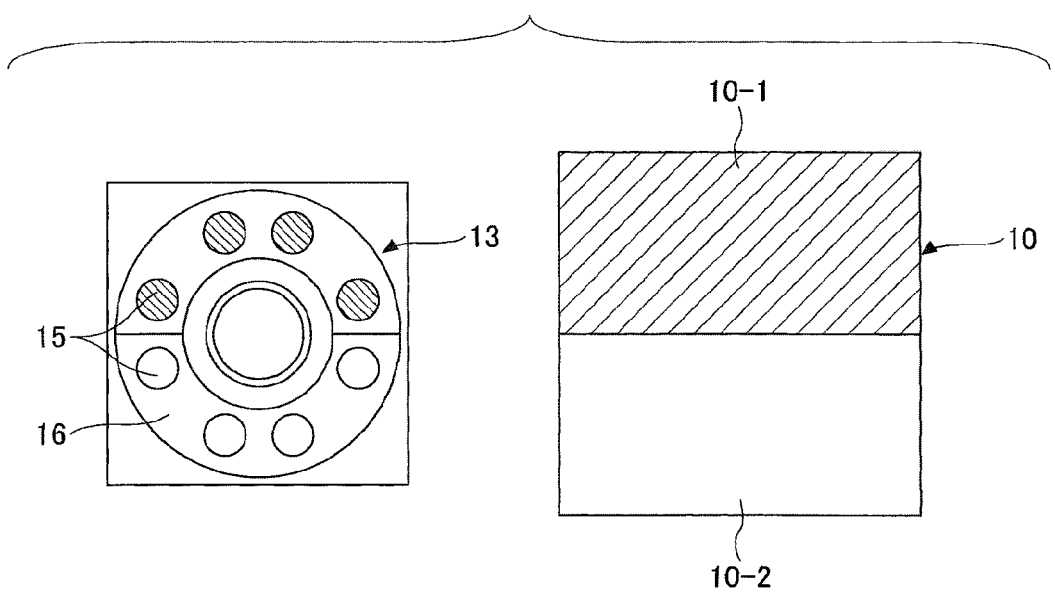
FIG. 10A is a diagram for explaining an example of the switching of the illuminating areas.
Figure 10B:
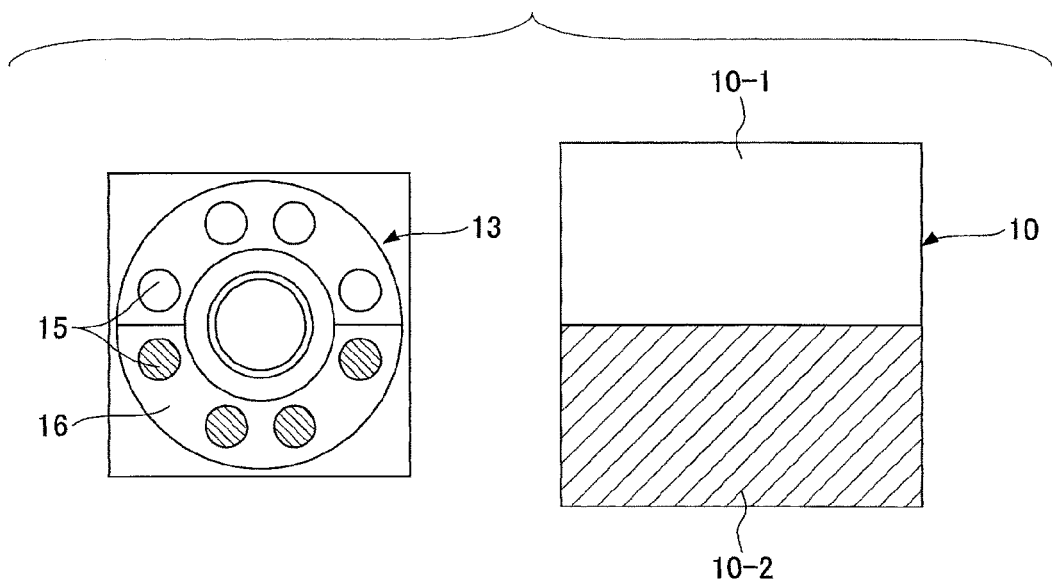
FIG. 10B is a diagram for explaining the example of the switching of the illuminating areas.

FIGS. 10A and 10B are diagrams for explaining the example of the switching of the illuminating areas. FIGS. 10A and 10B are diagrams for explaining the switching of the first and second illuminating areas 10-1 and 10-2 equally segmenting the illuminating region 10 into two areas. In FIGS. 10A and 10B, those parts that are the same as those corresponding parts in FIGS. 5A through 5C and FIGS. 6A and 6B are designated by the same reference numerals, and a description thereof will be omitted. In FIGS. 10A and 10B, the LED 15 that is turned on is indicated by hatchings.

During the first time interval, the 4 upper half LEDs 15 are turned on, and the 4 lower half LEDs 15 are turned off, as illustrated on a left side of FIG. 10A. Hence, the illumination light from the 4 LEDs 15 that are on is irradiated on the illuminating area 10-1 indicated by the hatchings on a right side of FIG. 10A. During the second time interval following the first time interval, the 4 lower half LEDs 15 are turned on, and the 4 upper half LEDs 15 are turned off, as illustrated on a left side of FIG. 10B. Hence, the illumination light from the 4 LEDs 15 that are on is irradiated on the illuminating area 10-2 indicated by the hatchings on a right side of FIG. 10B. The first time interval and the second time interval alternately repeated thereafter in a similar manner, so that the illuminating region 10 is formed by combining the first and second illuminating areas 10-1 and 10-2 that are irradiated by the illumination light in time division. In addition, during the first time interval, the irradiation of the illumination light onto the first illuminating area 10-1, and the acquisition of each line of the image data within the first exposure area 2-1 of the rolling shutter type image sensor 201 and the transfer of each acquired line of the image data to the buffer, are synchronized. Similarly, during the second time interval, the irradiation of the illumination light onto the second illuminating area 10-2, and the acquisition of each line of the image data within the second exposure area 2-2 of the rolling shutter type image sensor 201 and the transfer of each acquired line of the image data to the buffer, are synchronized. By irradiating the illumination light onto the first and second illuminating areas 10-1 and 10-2 of the illuminating region 10 in time division, it is possible to reduce the number of LEDs 15 that are simultaneously driven (that is, turned on) by one-half and thus reduce the power consumption by one-half, compared to the case in which the illumination light irradiates the entire illuminating region 10 at one time. The shapes and areas of the first and second illuminating areas 10-1 and 10-2 are preferably the same.

FIGS. 11A through 11D are diagrams for explaining another example of the switching of the illuminating areas. FIGS. 11A through 11D are diagrams for explaining the switching of first through fourth illuminating areas 10-1 through 10-4 equally segmenting the illuminating region 10 into four areas. In FIGS. 11A through 11D, those parts that are the same as those corresponding parts in FIGS. 5A through 5C and FIGS. 6A and 6B are designated by the same reference numerals, and a description thereof will be omitted. In FIGS. 11A through 11D, the LED 15 that is turned on is indicated by hatchings.

Figure 11C:
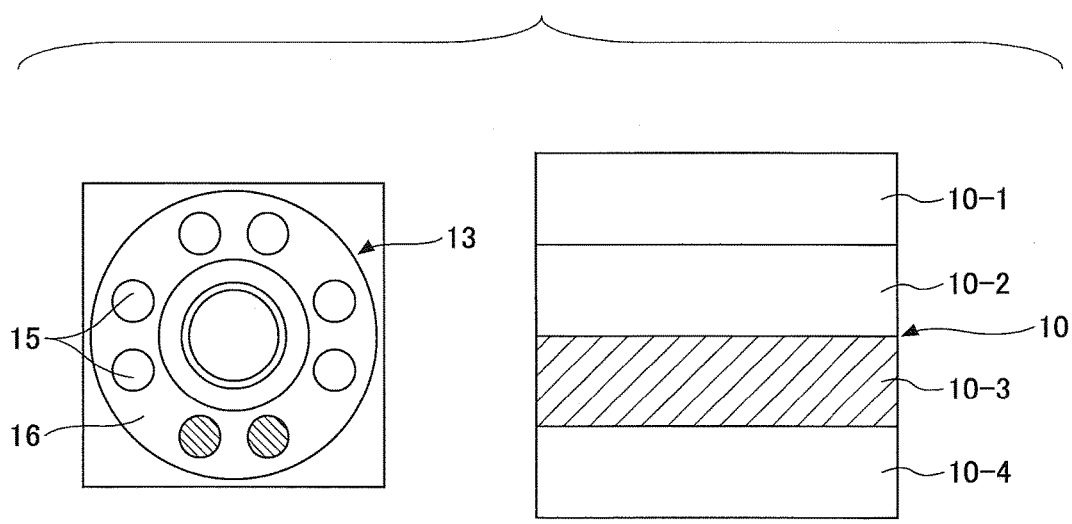
FIG. 11C is a diagram for explaining the other example of the switching of the illuminating areas.
Figure 11D:
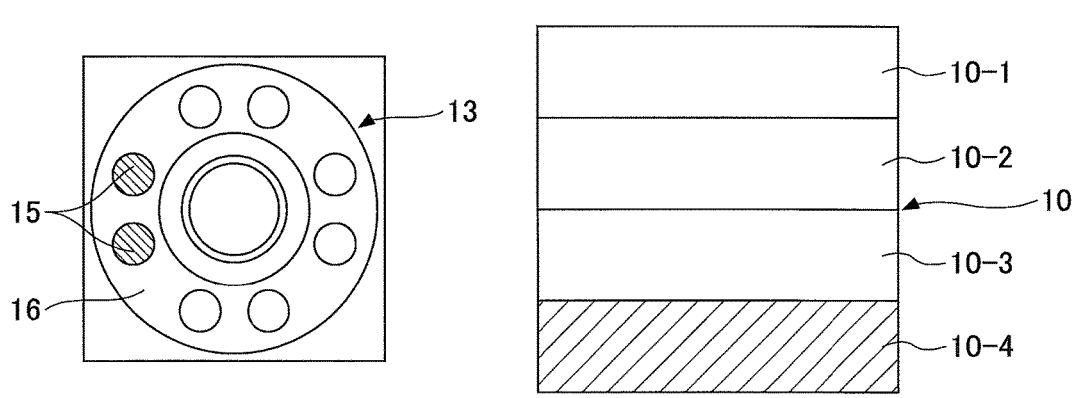
FIG. 11D is a diagram for explaining the other example of the switching of the illuminating areas.

During the first time interval, the 2 upper LEDs 15 are turned on, and the remaining 6 LEDs 15 are turned off, as illustrated on a left side of FIG. 11A. Hence, the illumination light from the 2 LEDs 15 that are on is irradiated on the illuminating area 10-1 indicated by the hatchings on a right side of FIG. 11A. During the second time interval following the first time interval, the 2 right LEDs 15 are turned on, and the remaining 6 LEDs 15 are turned off, as illustrated on a left side of FIG. 11B. Hence, the illumination light from the 2 LEDs 15 that are on is irradiated on the illuminating area 10-2 indicated by the hatchings on a right side of FIG. 11B. During the third time interval following the second time interval, the 2 lower LEDs 15 are turned on, and the remaining 6 LEDs 15 are turned off, as illustrated on a left side of FIG. 11C. Hence, the illumination light from the 2 LEDs 15 that are on is irradiated on the illuminating area 10-3 as indicated by the hatchings on a right side of FIG. 11C. During the fourth time interval following the third time interval, the 2 left LEDs 15 are turned on, and the remaining 6 LEDs 15 are turned off, as illustrated on a left side of FIG. 11D. Hence, the illumination light from the 2 LEDs 15 that are on is irradiated on the illuminating area 10-4 as indicated by the hatchings on a right side of FIG. 11D. The first through fourth time intervals are repeated in this order thereafter in a similar manner, so that the illuminating region 10 is formed by combining the first through fourth illuminating areas 10-1 through 10-4 that are irradiated by the illumination light in time division. In addition, during the first time interval, the irradiation of the illumination light onto the first illuminating area 10-1, and the acquisition of each line of the image data within the first exposure area 2-1 of the rolling shutter type image sensor 201 and the transfer of each acquired line of the image data to the buffer, are synchronized. Similarly, during the second time interval, the irradiation of the illumination light onto the second illuminating area 10-2, and the acquisition of each line of the image data within the second exposure area 2-2 of the rolling shutter type image sensor 201 and the transfer of each acquired line of the image data to the buffer, are synchronized. During the third time interval, the irradiation of the illumination light onto the third illuminating area 10-3, and the acquisition of each line of the image data within the third exposure area 2-3 of the rolling shutter type image sensor 201 and the transfer of each acquired line of the image data to the buffer, are synchronized. Further, during the fourth time interval, the irradiation of the illumination light onto the fourth illuminating area 10-4, and the acquisition of each line of the image data within the fourth exposure area 2-4 of the rolling shutter type image sensor 201 and the transfer of each acquired line of the image data to the buffer, are synchronized. By irradiating the illumination light onto the first through fourth illuminating areas 10-1 through 10-4 of the illuminating region 10 in time division, it is possible to reduce the number of LEDs 15 that are simultaneously driven (that is, turned on) by one-fourth and thus reduce the power consumption by one-fourth, compared to the case in which the illumination light irradiates the entire illuminating region 10 at one time. The shapes and areas of the first through fourth illuminating areas 10-1 through 10-4 are preferably the same.

Accordingly, when a segmenting number of the illuminating region 10 is denoted by N (N is a natural number greater than or equal to 2), that is, the number of illuminating areas forming the illuminating region 10 is denoted by N, a number M of LEDs 15 provided in the illuminating optical system 13 may be represented by L (L is a natural number) times the number N, namely, $M=L \times N$. In addition, a number of LEDs 15 that are driven (that is, turned on) simultaneously (or the number of LEDs 15 that are driven simultaneously and belong to the same LED group) can be represented by $M/N=L$. The irradiation of light to the first through Nth illuminating areas 10-1 through 10-N during the first through Nth time intervals, and acquisition of each line of image data within first through Nth exposure areas 2-1 through 2-N of the image sensor 201 corresponding to the first through Nth illuminating areas 10-1 through 10-N (only the first and second exposure areas 2-1 and 2-2 illustrated in FIG. 4) and transfer of each acquired line of the image data to the buffer, are synchronized. By successively repeating the process of irradiating the illumination light onto the first through Nth illuminating areas 10-1 through 10-N of the illuminating region 10 in time division, it is possible to reduce the number of LEDs 15 that are simultaneously driven (that is, turned on) by 1/N and thus reduce the power consumption by 1/N, compared to the case in which the illumination light irradiates the entire illuminating region 10 at one time. The shapes and areas of the first through Nth illuminating areas 10-1 through 10-N are preferably the same.

FIG. 12 is a flow chart for explaining an example of an illuminating area switching process. The switching process illustrated in FIG. 12 may be executed by a computer (or processor) which will be described later, for example.

In FIG. 12, the computer, in step S1, simultaneously turns on $M/N=L$ LEDs 15 belonging to a first LED group, amongst the M LEDs 15. The computer, in step S2 starts acquiring the image from the image sensor 201 of the imaging optical system 12. The computer, in step S3, transfers each line of the image acquired from the image sensor 201 to the buffer and stores the image in the buffer. The computer, in step S4, counts a number of lines of the image stored in (or transferred to) the buffer. The computer, in step S5, judges whether the counted number of lines reached a predetermined number. The process returns to step S2 when the judgment result in step S5 is NO, and the process advances to step S6 when the judgment result in step S5 is YES. The predetermined number refers to the number of lines existing within one exposure area. The computer, in step S6, carries out a control to switch the M/N=L LEDs 15 to be simultaneously turned on to the L LEDs 15 belonging to a next LED group, and the process returns to step S2.

On the other hand, after step S3, the computer, in step S7, judges whether the number of lines of the image reached the total number of lines of the image sensor 201 (that is, the total number of lines existing within all of the exposure areas). The process advances to step S8 when the judgment result in step S7 is NO, and the process ends when the judgment result in step S7 is YES. The computer, in step S8, carries out a control to switch the M/N=L LEDs 15 to be simultaneously turned on to the L LEDs 15 belonging to a next LED group, and the process returns to step S2.

Figure 13:
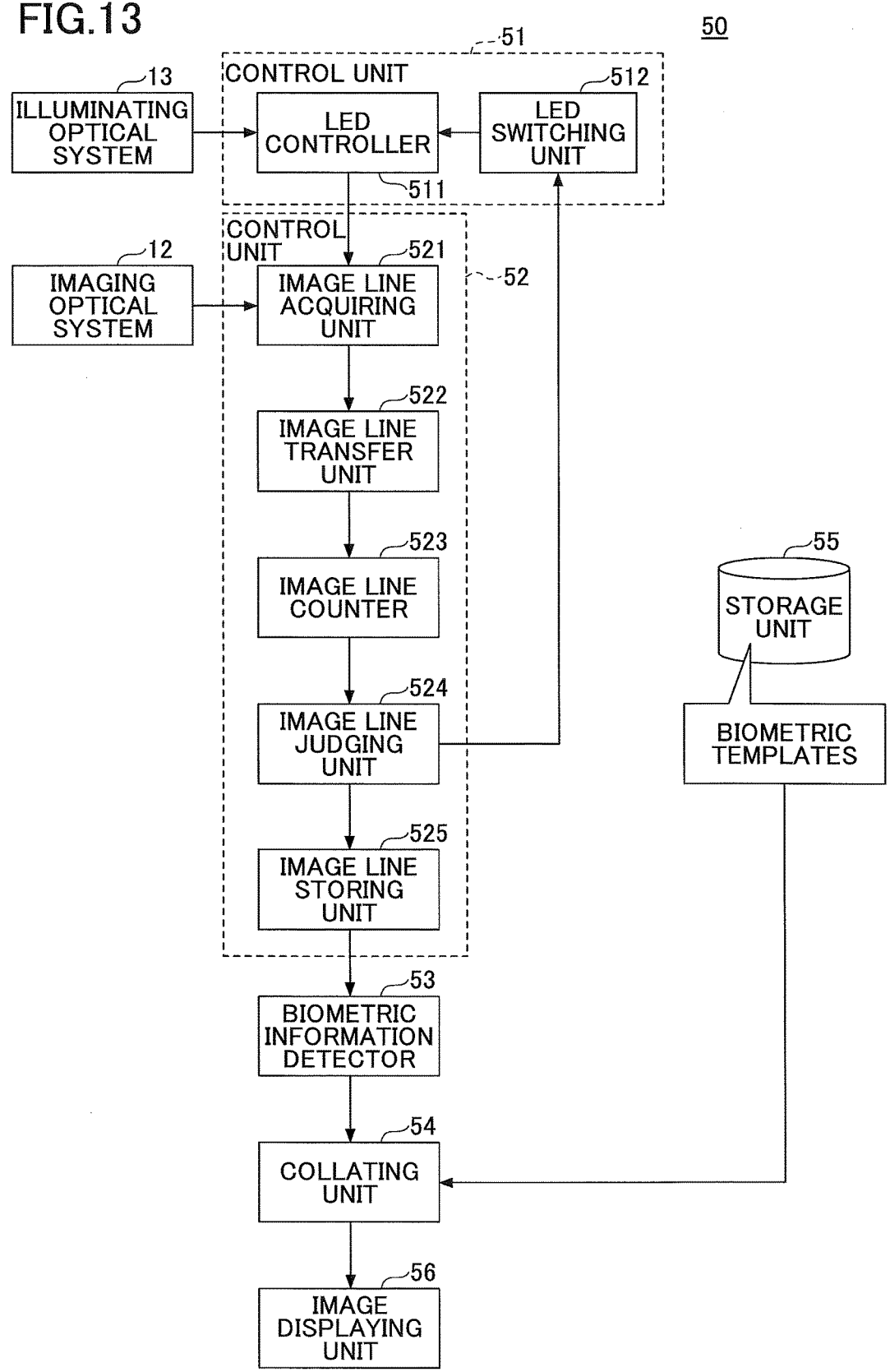
FIG. 13 is a block diagram illustrating an example of the biometric authentication apparatus in one embodiment.

FIG. 13 is a block diagram illustrating an example of the biometric authentication apparatus in one embodiment. A biometric authentication apparatus 50 illustrated in FIG. 13 includes the imaging optical system 12, the illuminating optical system 13, a control unit 51 for the illuminating optical system 13, a control unit 52 for the imaging optical system 12, a biometric information detector 53, a collating unit 54, a storage unit 55, and an image displaying unit 56. The control unit 51 for the illuminating optical system 13 includes an LED controller 511 and an LED switching unit 512. The control unit 52 for the imaging optical system 12 includes an image line acquiring unit 521, an image line transfer unit 522, an image line counter 523, an image line judging unit 524, and an image line storing unit 525.

When a user places the user's hand, which is an example of the biometric capturing target, within a region that includes the illuminating region 10 of the illuminating optical system 13, the biometric authentication apparatus 50 detects the biometric capturing target (or biometric authenticating target) by a known contactless method, and the LED controller 511 executes step S1 illustrated in FIG. 12 and turns on the LEDs 15 belonging to one LED group. Hence, the illumination light from the on LEDs 15 are diffracted by the diffraction optical element 16 to irradiate one of the illuminating areas 10-1 and 10-2 illustrated in FIGS. 10A and 10B, for example, or to irradiate one of the illuminating areas 10-1 through 10-4 illustrated in FIGS. 11A through 11D. The imaging optical system 12 captures the biometric part (palm in this example) including the illuminating region 10, and the image line acquiring unit 521 executes step S2, for example, to acquire the captured image, and the image displaying unit 56 displays the acquired, captured image on a display unit (not illustrated).

When the image line transfer unit 522 and the image line storing unit 525 execute step S3, the image line transfer unit 522 transfers each line of the captured image acquired by the image line acquiring unit 521 to the buffer, and the image line storing unit 525 stores each line of the transferred, captured image in the buffer. When the image line counter 523 executes step S4, the number of lines of the image stored in the buffer, that is, the number of lines of the image transferred to the buffer, is counted. When the image line judging unit 524 executes step S5, a judgment is made to determine whether the number of lines counted by the image line counter 523 reached a predetermined number. The process returns to step S2 when the judgment result is NO, and the process advances to step S6 when the judgment result is YES. When the LED switching unit 512 executes step S6, a control is carried out to switch the M/N=L LEDs 15 to be simultaneously turned on to the L LEDs 15 belonging to the next LED group, and the process returns to step S2.

On the other hand, after step S3, when the image line counter 523 executes step S7, a judgment is made to determine whether the counted number of lines of the image reached the total number of lines of the image sensor 201 (that is, the total number of lines existing within all of the exposure areas), and the process advances to step S8 when the judgment result is NO, and the process ends when the judgment result is YES. When the LED switching unit 512 executes step S8, a control is carried out to switch the M/N=L LEDs 15 to be simultaneously turned on to the L LEDs 15 belonging to the next LED group, and the process returns to step S2.

The irradiation of the illumination light to the first through Nth illuminating areas 10-1 through 10-N during the first through Nth time intervals, and acquisition of each line of image data within first through Nth exposure areas 2-1 through 2-N of the image sensor 201 corresponding to the first through Nth illuminating areas 10-1 through 10-N and transfer of each acquired line of the image data to the buffer, are synchronized. A synchronizing unit that controls this synchronization may be formed by the image line counter 523 and the image line judging unit 524 within the control unit 52 for the imaging optical system 12, for example.

When the process illustrated in FIG. 12 ends, the biometric information detector 53 detects biometric information from the image acquired by the image line acquiring unit 521. The collating unit 54 collates the detected biometric information with biometric templates prestored in the storage unit 55, and the image displaying unit 56 displays a collated result (or matched result) of the collating unit 54 on the display unit. The image displaying unit 56 may display on the display unit a message or the like of the collated result including whether the detected biometric information matches one of the prestored biometric templates. The image displaying unit 56 is an example of an output device to output the collated result of the collating unit 54. The output device to output the collated result is not limited to the image displaying unit 56 that displays the collated result, and may be formed by a speech synthesis unit that outputs the collated result by speech, or the like, for example. In addition, the image displaying unit 56 may display the collated result of the collating unit 54 or a biometric image.

Figure 14:
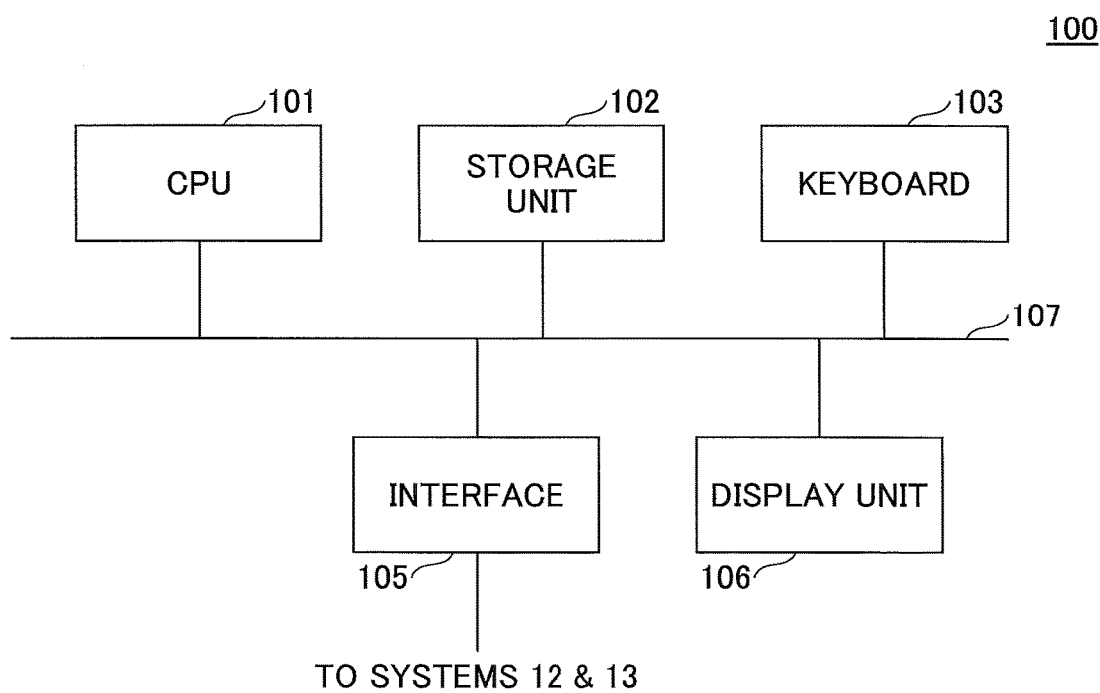
FIG. 14 is a block diagram illustrating an example of a configuration of a computer.

FIG. 14 is a block diagram illustrating an example of a configuration of a computer. The biometric authentication apparatus 50 illustrated in FIG. 13 may be formed by a computer 100 illustrated in FIG. 13 to perform a biometric authentication process. The computer 100 illustrated in FIG. 14 may be formed by a general-purposes computer, such as a personal computer, for example. The computer 100 may include a CPU (Central Processing Unit) 101 which is an example of a processor, a storage unit 102, a keyboard 103 which is an example of an input device, an interface 105, and a display unit 106 which is an example of the output device. In this example, the CPU 101, the storage unit 102, the keyboard 103, the interface 105, and the display unit 106 are connected via a bus 107. However, the configuration of the computer 100 is not limited to the configuration employing the bus 107 for the connection. The imaging optical system 12 and the illuminating optical system 13 are connected to the interface 105, for example.

The storage unit 102 stores programs to the executed by the CPU 101, various kinds of data including the biometric templates, or the like. The storage unit 102 may be formed by any suitable non-transitory computer-readable storage medium, including a memory device, a storage unit such as a HDD (Hard Disk Drive), or the like. The CPU 101 controls the entire computer 100 by executing one or more programs stored in the storage unit 102. The CPU 101 can perform all of the functions, or a part of the functions of the LED controller 511, the LED switching unit 512, the image line acquiring unit 521, the image line transfer unit 522, the image line counter 523, the image line judging unit 524, the image line storing unit 525, the biometric information detector 53, the collating unit 54, and the image displaying unit 56 illustrated in FIG. 13 by executing one or more programs. The CPU 101 can execute one or more programs to perform the process of FIG. 12, for example, in order to perform the functions of control unit 51 for the illuminating optical system 13 and the control unit 52 for the imaging optical system 12 described above. The storage unit 102 may also perform the function of the storage unit 55 illustrated in FIG. 13, the function of the buffer, or the like.

The keyboard 103 is used to input commands and data to the CPU 101. The interface 105 is used to connect the computer 100 to an external apparatus (not illustrated). The display unit 106 displays various data with respect to the user (or operator) of the computer 100, under the control of the CPU 101. The various kinds of data displayed on the display unit 106 may include the input image that is acquired, the message of the collated result, or the like.

The light from the plurality of LEDs can be diffracted to the plurality of illuminating areas by the diffraction optical element, and thus, the position of each LED is not limited to a certain position, and the arrangement of the plurality of LEDs does not necessarily need to have regularity or symmetry. For this reason, in a case in which each of the above described embodiments is applied to an electronic apparatus that includes a camera and a light source, for example, the diffraction optical element described above may be provided on a detachable adapter, and this detachable adapter may be connected to the light source part. In this case, the light from the light source can irradiate a predetermined illuminating area via the diffraction optical element, without being dependent on the positional relationship of a lens of the camera and the light source in the electronic apparatus, and the image within the predetermined illuminating region may be captured by the camera. Further, when the light source of the electronic apparatus in this case is a white light emitting diode, for example, the captured image may be used for face recognition or the like by improving the illumination efficiency by the adapter. Moreover, the adapter may be provided with a light source to output light having wavelengths or properties selected according to the usage.

According to each of the embodiments described above, it is possible to reduce the power consumption even in a case in which the illuminating region of the capturing target is large compared to the illumination device. For this reason, it is possible to simultaneously reduce both the size and the power consumption of the illumination device and the biometric authentication apparatus, and the illumination device and the biometric authentication apparatus can be used for the biometric authentication such as the palm vein authentication. Hence, the illumination device and the biometric authentication apparatus may be applied to an electronic apparatus that is driven by a battery, such as a portable electronic apparatus, for example.

In each of the embodiments described above, the palm vein pattern is used as an example of the biometric information. However, the biometric information is not limited to the palm vein pattern, and may be a fingerprint, a finger vein pattern, a palmprint or palm pattern, an iris pattern of the human eye, or the like, for example.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An illumination device comprising:
M light sources provided on a surface of a substrate;
a diffraction optical element configured to diffract light from the M light sources to irradiate N illuminating areas into which an illuminating region is segmented; and
a control unit configured to turn on L=M/N light sources of each of first through Nth light source groups during first through Nth time intervals, respectively, and successively irradiate the light from the on L light sources of the first through Nth light source groups in time division onto first through N illuminating areas forming the illuminating region,
where M and N are natural numbers greater than or equal to 2, and L is a natural number greater than or equal to 1.

2. The illumination device as claimed in claim 1, wherein an area of the illuminating region is greater than an area occupied by the diffraction optical element and the M light sources on a plane parallel to the surface of the substrate.

3. The illumination device as claimed in claim 1, wherein a light intensity distribution in the illuminating region formed by combining the first through Nth illuminating areas is uniform.

4. The illumination device as claimed in claim 1, wherein the first through Nth illuminating areas have identical shapes and identical areas.

5. The illumination device as claimed in claim 4, wherein the first through Nth illuminating areas have a rectangular shape.

6. The illumination device as claimed in claim 1, wherein the diffraction optical element comprises an assembly of a plurality of diffraction gratings that have different pitch and rotating direction and are arranged two-dimensionally.

7. The illumination device as claimed in claim 6, wherein a number of the plurality of diffraction gratings that are arranged two-dimensionally is set according to an area of the illuminating region.

8. The illumination device as claimed in claim 6, wherein the pitch and the rotating direction of each of the plurality of diffraction gratings are set so that a light intensity in one of two mutually adjacent illuminating areas gradually decreases towards a boundary part of the two mutually adjacent illuminating areas, a light intensity in an other of the two mutually adjacent illuminating areas gradually decreases towards the boundary part, and the two mutually adjacent illuminating areas overlap at the boundary part such that a total light intensity at the boundary part is equal to a light intensity at parts of the two mutually adjacent illuminating areas other than the boundary part.

9. The illumination device as claimed in claim 1, wherein the M light sources emit light in a wavelength band of a single color.

10. A biometric authentication apparatus comprising:
an illumination device including
M light sources provided on a surface of a substrate;
a diffraction optical element configured to diffract light from the M light sources to irradiate N illuminating areas into which an illuminating region is segmented; and
a control unit configured to turn on L=M/N light sources of each of first through Nth light source groups during first through Nth time intervals, respectively, and successively irradiate the light from the on L light sources of the first through Nth light source groups in time division onto first through N illuminating areas forming the illuminating region,
where M and N are natural numbers greater than or equal to 2, and L is a natural number greater than or equal to 1;
an imaging optical system configured to capture a biometric image of an authentication target, including the illuminating region; and
a collating unit configured to collate the biometric image captured by the imaging optical system and a biometric template, for biometric authentication.

11. The biometric authentication apparatus as claimed in claim 10, wherein the imaging optical system includes a rolling shutter type image sensor, and further comprising:
a synchronizing unit configured to synchronize irradiation of light to the first through Nth illuminating areas during the first through Nth time intervals, and acquisition of each line of image data within first through Nth exposure areas of the image sensor corresponding to the first through Nth illuminating areas and transfer of each acquired line of the image data to a buffer.

12. The biometric authentication apparatus as claimed in claim 11, wherein the first through Nth exposure areas respectively correspond to an area of one line of the image sensor or greater, and less than or equal to one-half a total exposure area of the image sensor.

13. The biometric authentication apparatus as claimed in claim 11, wherein an overlapping part of two exposure areas of the first through Nth exposure areas, corresponding to an overlapping part of two mutually adjacent illuminating areas, amount to an area of one line of the image sensor or greater.

14. The biometric authentication apparatus as claimed in claim 11, wherein the synchronizing unit includes
a counter configured to count a number of lines of the image data acquired and transferred to the buffer; and
a judging unit configured to judge whether the number of lines of the image data transferred to the buffer reached a number of lines existing within one exposure area of the image sensor.

15. The biometric authentication apparatus as claimed in claim 14, wherein the control unit successively switches the first through Nth light source groups including the light sources to be turned on, until the number of lines of the image data acquired and transferred to the buffer and counted by the counter reaches a total number of lines of the image sensor.

* * * * *